United States Patent [19]
Mine

[11] Patent Number: 6,138,084
[45] Date of Patent: Oct. 24, 2000

[54] RADIUS OF CURVATURE DETECTING APPARATUS AND THE METHOD THEREOF

[75] Inventor: Atsushi Mine, Tokyo, Japan

[73] Assignee: Fuji Jukogyo Kabushiki Kaisha, Tokyo, Japan

[21] Appl. No.: 09/095,529

[22] Filed: Jun. 10, 1998

[30]     Foreign Application Priority Data

Jun. 12, 1997  [JP]  Japan .................................... 9-155409

[51] Int. Cl.$^7$ ............................ G06F 15/00; G01C 21/00
[52] U.S. Cl. ........................ 702/157; 702/150; 702/158; 701/207; 701/208
[58] Field of Search ..................................... 702/157, 158, 702/149, 150; 701/1, 201, 206, 207, 208, 209, 210; 340/210, 988, 995

[56]           References Cited

U.S. PATENT DOCUMENTS

| 5,539,397 | 7/1996 | Asanuma et al. | 701/208 |
| 5,546,311 | 8/1996 | Sekine | 701/208 |
| 5,661,650 | 8/1997 | Sekine et al. | 701/207 |
| 5,748,476 | 5/1998 | Sekine et al. | 340/995 |
| 5,978,731 | 11/1999 | Matsuda | 701/208 |

FOREIGN PATENT DOCUMENTS 8194886  7/1996  Japan .

*Primary Examiner*—Marc S. Hoff
*Assistant Examiner*—Bryan Bui
*Attorney, Agent, or Firm*—Martin A. Farber

[57]           ABSTRACT

A radius of curvature detecting apparatus and method of a vehicle for detecting a radius of curvature of a curve based on road information obtained from a vehicle navigation system comprises, three-points detection of a first point, a second point and a third point in order of traveling direction of the vehicle from point data showing a road configuration which are provided by the vehicle navigation system, distance comparison of a distance of a straight line connecting the first point and the second point with a distance of a straight line connecting the second point and the third point and for determining a short straight line and a long straight line, respectively, mid-point calculation for finding a mid-point point located at a half distance of the short straight line from the second point, equivalent mid-point calculation for finding an equivalent mid-point located at the half distance from the second point on the long straight line, and radius of curvature calculation for determining a point of intersection of perpendicular lines from the mid-point point and the equivalent mid-point as a center of the curve and for calculating a radius of curvature based on the center of the curve. The calculated radius of curvature is corrected, for example when the road width is small or the distance of the short straight line is large.

8 Claims, 4 Drawing Sheets

| SHORTER DISTANCE OF P1P2, P2P3 | SMALLER THAN 20 METERS | LARGER THAN 20 METERS SMALLER THAN 100 METERS | LARGER THAN 100 METERS |
|---|---|---|---|
| $\alpha$ | 1.2 | 0.6 | 0.3 |

RADIUS OF CURVATURE DETECTING APPARATUS AND THE METHOD THEREOF

BACKGROUND OF THE INVENTION

1. Field of the invention

The present invention relates to a radius of curvature detecting apparatus and method for calculating a radius of curvature of a curve of a road based on road information obtained from a navigation system and the like.

2. Prior Arts

In recent years, various kinds of electronically controlled safe driving apparatuses employing a vehicle navigation system and the like have been developed. In those apparatuses, there are safe driving techniques in which a radius of curvature of a curve ahead is calculated based upon information on maps obtained from the vehicle navigation system, and based on the calculated radius and a vehicle speed before entering into the curve, an alarm is issued to warn a vehicle driver to reduce the vehicle speed or a brake is applied automatically so as to reduce the vehicle speed up to a proper safe speed, if it is judged that the vehicle will not be able to negotiate the curve.

Whether those apparatuses are practicable or not in motor vehicles depends on how the calculated or estimated radius of curvature is proximate to that of an actual curve. For example, as shown in FIG. 6a, a point T referred to as a curve detecting point is considered on a vehicle pass line RL ahead of the vehicle. Then, a first point S is placed at a point going back from the point T by a sampling distance Lj which is established based on a radius of curvature of a previous curve. Next, a second point U is placed at a point going forward from the point T by an equal distance Lj. After that, a first vector ST drawn from the first point S to the curve detecting point T and a second vector TU drawn from the point S to the point U form an angle θ which is referred to as a "curvature index" at the curve detecting point T. Thus, a radius of curvature R of the curve is calculated according to the following equation:

$$R = Lj/(2 \cdot \sin(\theta/2))$$

Such calculation method is disclosed in Japanese Patent Application Laid-open No. Toku-Kai-Hei 8-194886.

The road data contained in maps obtained from the vehicle navigation system are constituted of points data inputted at discretionary intervals and lines data formed by connecting two adjacent points successively, as illustrated in FIG. 5.

According to this prior art, it arouses a problem of accuracy to apply inherent points data of the navigation system to the calculation of radii of curvature and therefore, as shown in FIG. 6b, interpolated points must be placed between the curve detecting point T and known data from the navigation system.

Further, as shown in FIG. 6c, in a case where the road bents complicatedly, depending on the way of establishment of the sampling distance Lj, it is impossible to link respective curve detecting points smoothly, so that the obtained road configuration presents a great difference from an actual one and as a result an accurate radius of curvature of the curve is unable to be produced.

Further, in order to estimate the road configuration, since the vehicle must pass through the three points S, T and U described above, a rather large radius of curvature tends to be calculated, this permitting the vehicle to enter into the curve at a vehicle speed larger than the limited vehicle speed without issuing an alarm or operating safe driving apparatuses.

SUMMARY OF THE INVENTION

It is an object of the present invention to provide a radius of curvature detecting apparatus of a vehicle capable of calculating at high speeds a proper radius of curvature of a curve by employing point data obtained from a vehicle navigation system as they are.

The object is attained by the following means:

three-points detecting means for detecting a first point, a second point and a third point in order of traveling direction of the vehicle from the point data showing a road configuration which are provided by the navigation system;

distance comparing means for comparing a distance of a straight line connecting the first point and the second point with a distance of a straight line connecting the second point and the third point and for determining a short straight line and a long straight line, respectively;

mid-point calculating means for finding a fourth point located at a half distance of the short straight line from the second point;

equivalent mid-point calculating means for finding a fifth point located at the half distance from the second point on the long straight line; and radius of curvature calculating means for determining a point of intersection of perpendicular lines from the fourth point and the fifth point, respectively, as a center of the curve and for calculating a radius of curvature based on the center of the curve.

DETAILED DESCRIPTION OF THE INVENTION

Figure 1:
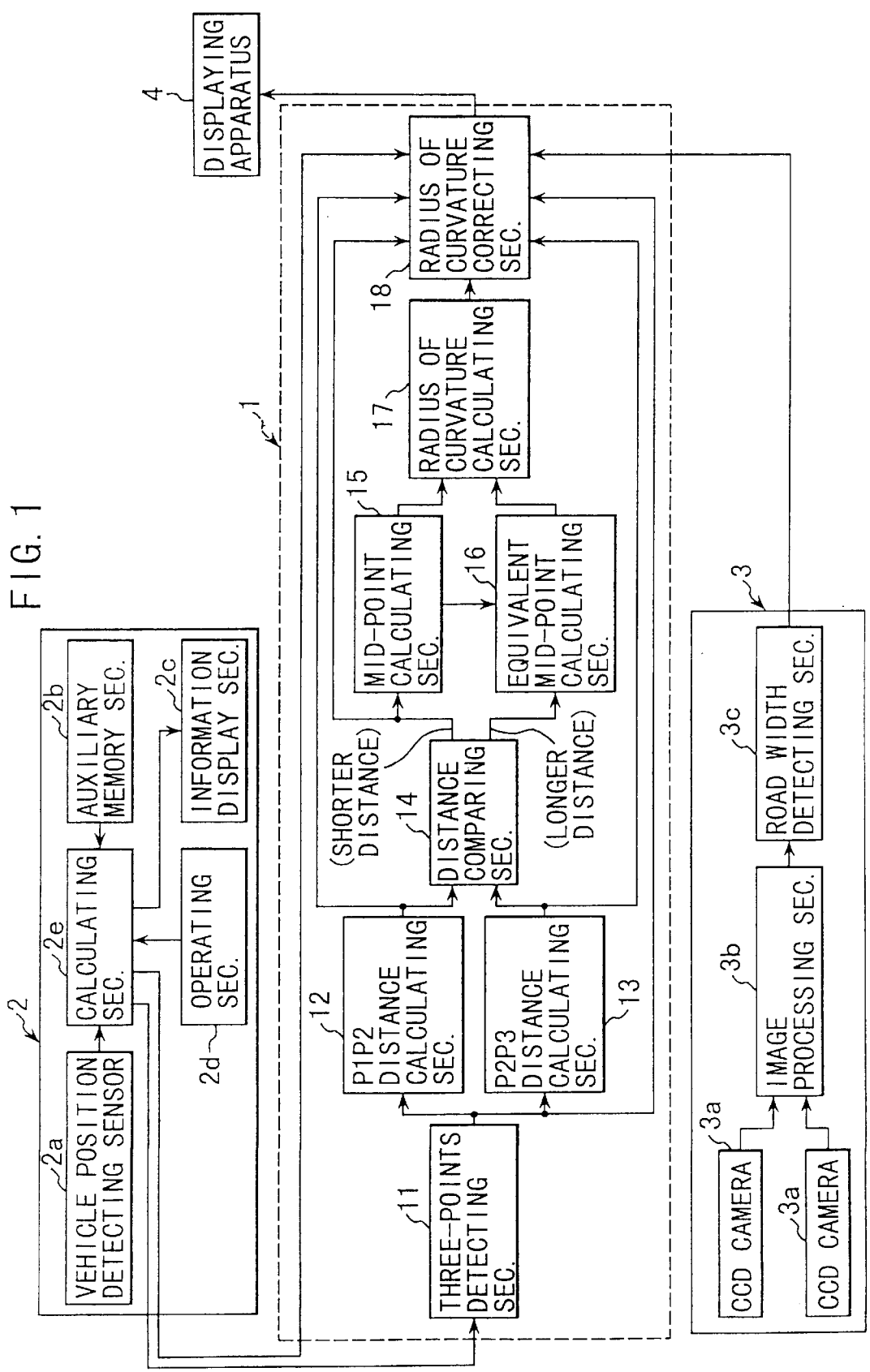
FIG. 1 is a block diagram showing a curvature radius detecting apparatus according to the present invention.

Referring now to FIG. 1, reference numeral 1 denotes a radius of curvature detecting apparatus to which point data for forming a road configuration and information for indicating a category of road, such as highways, state roads, provincial roads and the like are inputted from a vehicle navigation system 2. Reference numeral 3 denotes a road width detecting apparatus for outputting road width information to the radius of curvature detecting apparatus 1. Based on those information from the vehicle navigation system 2 and the road width detecting apparatus 3, radii of curvature of curves calculated in the radius of curvature detecting apparatus 1 are displayed on a displaying apparatus 4.

The vehicle navigation system 2 is of a known system which comprises a vehicle position detecting sensor section 2a, an auxiliary memory section 2b, an information display section 2c, an operating section 2d and a calculating section 2e.

Specifically, the vehicle position detecting sensor section 2a includes a radio receiver for receiving a radio wave from a so-called GPS (Global Positioning System) satellite to detect the present position of the vehicle, an earth magnetism sensor for detecting the absolute traveling direction of the vehicle and a wheel speed sensor for detecting a rotational speed of a wheel from which a vehicle speed and a traveling distance are found.

Figures 4, 5:
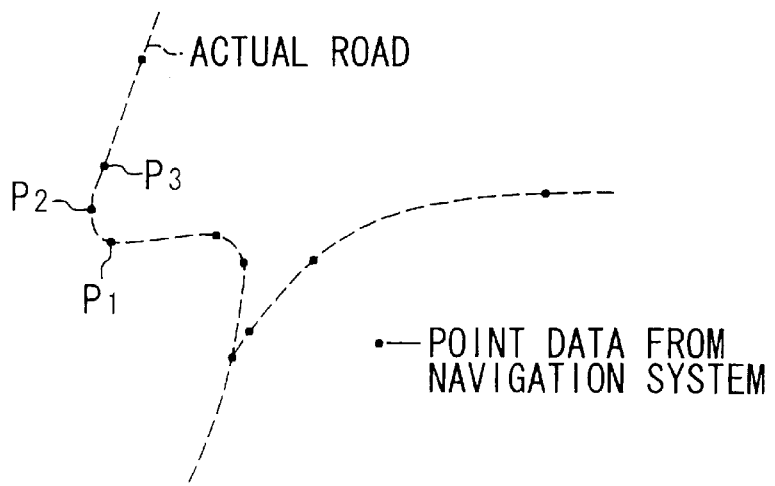
FIG. 4 is a table of correction coefficients.
FIG. 5 is a diagram showing an example of points data obtained from a vehicle navigation system.
Figure 6A:
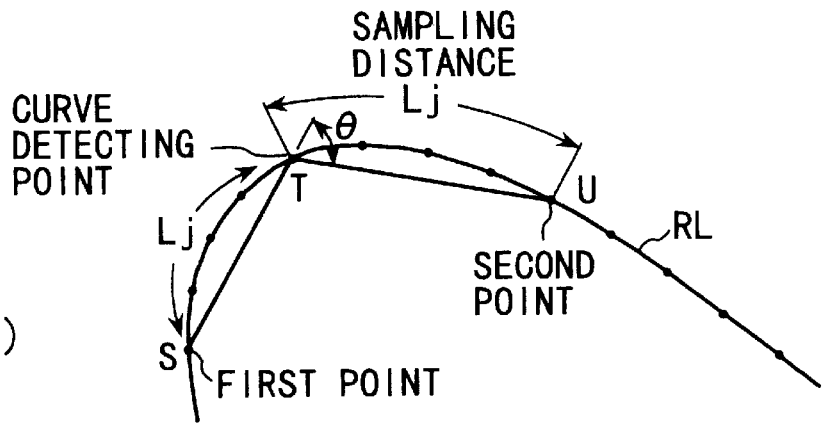
FIGS. 6a to 6c are diagrams showing an example of calculation of a radius of curvature according to a prior art.
Figure 6B:
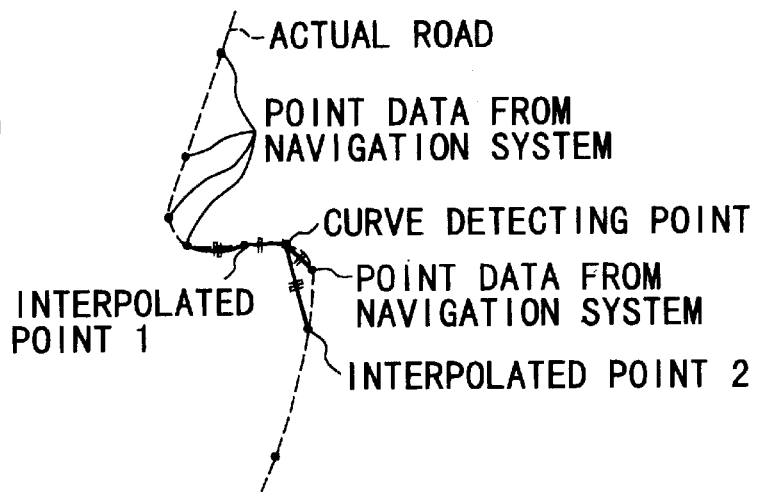
Figure 6C:
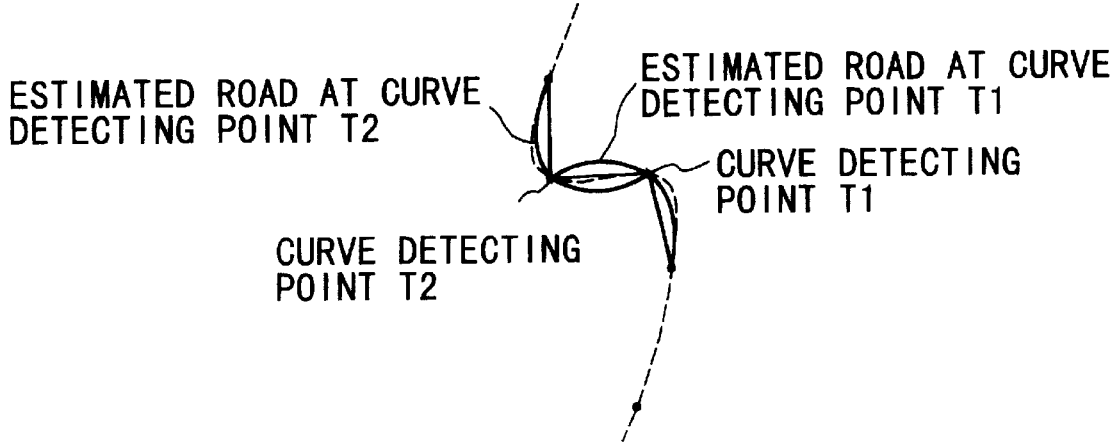

The auxiliary memory section 2b is a compact disc (CD-ROM) player for driving a compact disc as a read only memory in which a great number of road maps, reduced to different sizes, including road and terrain information are stored. Further, in the compact disc, road information is stored being categorized into highways, state roads, provincial roads and the like and various road related information like traffic signals and traffic signs are also stored. The road data in the road maps, as shown in FIG. 5, are constituted of point data inputted at discretionary intervals and line data formed by connecting two adjacent points successively.

The information display section 2c is formed of a liquid crystal display on which maps, a position of a self vehicle in terms of latitude, longitude and altitude, bearings, a position of a self vehicle on maps, a most-proper pass from the present position to a destination and the like are displayed.

The operating section 2d, integrally formed with the information display section 2c, has a touch switch panel to which instruction of changing map sizes, indication of the name of a place, various provincial information, guidance to a proper pass and the like are inputted.

The calculating section 2e performs so-called "map-matching" in which the vehicle traveling conditions obtained from the vehicle position detecting section 2a and the map information read out from the auxiliary memory section 2b are synthesized. The result of the map-matching, responsive to operating signals from the operating section 2d, is sent to the information display section 2c on which the present position of the vehicle, a surrounding map, a most-proper pass to the destination and the like are displayed. Further, the point data and the road category information are displayed when they are needed.

The road width detecting apparatus 3 is constituted of a pair of CCD cameras 3a, an image processing section 3b and a road width detecting section 3c. The pair of CCD cameras 3a, 3a left and right one, respectively, are mounted on the ceiling at the front of the passenger compartment at a given interval so as to image stereoscopic pictures of objects in the frontal direction of the vehicle from different viewpoints. Image signals of those objects taken by the CCD cameras 3a, 3a are inputted to the image processing section 3b.

The image processing section 3b processes a pair of stereoscopic pictures according to a principle of triangulation to obtain three-dimensional distance distribution over an entire image and outputs a distance image including the distance distribution to the road width detecting section 3c.

The road width detecting section 3c expresses the distance distribution of the distance image as a histogram and recognizes an outline of a road by use of the histogram. A road width calculated from thus recognized road is outputted to the radius of curvature detecting apparatus 1. For example, lane markers of the road are expressed as a plurality of broken lines and the road width is calculated from a transverse interval across the left and right broken lines.

The displaying apparatus 4 and the information display section 2c of the navigation system 2 share a common liquid crystal display. Calculated radii of curvature are displayed on this liquid crystal display to assist a driver's safe driving.

The radius of curvature detecting apparatus 1 comprises a three-points detecting section 11, a $P_1P_2$ distance calculating section 12, a $P_2P_3$ distance calculating section 13, a distance comparing section 14, a mid-point calculating section 15, an equivalent mid-point calculating section 16, a radius of curvature calculating section 17 and a radius of curvature correcting section 18.

The three-points detecting section 11 acts as a means for detecting three points, in which a first point $P_1$, a second point P2 and a third point $P_3$ in order of traveling as shown in FIG. 5, located in a traveling direction of the vehicle or on a road selected by a driver, are detected based on the point data inputted from the navigation system 2. These points $P_1$, $P_2$, $P_3$ have corresponding coordinates $(X_1, Y_1)$, $(X_{12}, Y_2)$, $(X_3, Y_3)$, respectively. The positional information of the points $P_1$, $P_2$ is sent to the $P_1P_2$ distance calculating section 12 wherein a straight line distance between $P_1$ and $P_2$ is calculated and outputted to the distance comparing section 14 and the radius of curvature correcting section 18, respectively. Similarly, the positional information of the points $P_2$, $P_3$ is sent to the $P_2P_3$ distance calculating section 13 wherein a straight line distance between $P_2$ and $P_3$ is calculated and outputted to the distance comparing section 14 and the correcting section 18, respectively.

In the distance comparing section 14, the straight line distance between $P_1$ and $P_2$ which is inputted from the $P_1P_2$ distance calculating section 12 is compared with the straight line distance between $P_2$ and $P_3$ which is inputted from the $P_2P_3$ distance calculating section 13. As a result of the comparison, the data including a position and a distance of a shorter straight line are outputted to the mid-point calculating section 15 and the radius of curvature correcting section 18, respectively and the data including a position and a distance of a longer straight line are outputted to the equivalent mid-point calculating section 16 and the radius of curvature correcting section 18, respectively.

That is, the $P_1P_2$ distance calculating section 12, the $P_2P_3$ distance calculating section 13 and the distance comparing section 14 form a distance comparing means. In case where it is judged that both distances are equal as a result of the comparison mentioned above, either straight line $P_1P_2$ or $P_2P_3$ may be employed, but in this embodiment the straight line $P_1P_2$ is treated as a shorter straight line.

The mid-point calculating section 15 acts as a mid-point calculating means, in which a half distance (length) of the shorter straight line is calculated based on the distance data inputted from the distance comparing section 14 and a mid-point is determined on that line. Assuming the shorter line to be a straight line connecting between $P_1$ and $P_2$, the mid-point $P_{12}$ $(X_{12}, Y_{12})$ is calculated as follows:

$$P_{12}=(X_{12}, Y_{12})=((X_1+X_2)/2, (Y_1+Y_2)/2)$$

These calculated data are outputted to the equivalent mid-point calculating section 16 and the radius of curvature calculating section 17, respectively.

In the equivalent mid-point calculating section 16 as an equivalent mid-point calculating means, an equivalent mid-point $P_{23}$ located at a distance equal to the half length of the shorter line is determined on the longer line based on the data inputted from the mid-point calculating section 15 and the coordinate $(X_{23}, Y_{23})$ of the equivalent mid-point $P_{23}$ is calculated according to the following equation:

$$P_{23}=P_2+P_2\overline{P_{23}}=(X_2, Y_2)+K_2 \cdot (X_3-X_2, Y_3-Y_2)=(X_{23}, Y_{23})$$

where $K_2=((X_2-X_1)^2+(Y_2-y_1)^2)^{1/2}/(2 \cdot ((X_3-X_2)^2+(Y_3-Y_2)^2)^{1/2})$ The positional data of the equivalent mid-point $P_{23}$ calculated in the equal distance calculating section 16 are outputted to the radius of curvature calculating section 17.

Figure 2:
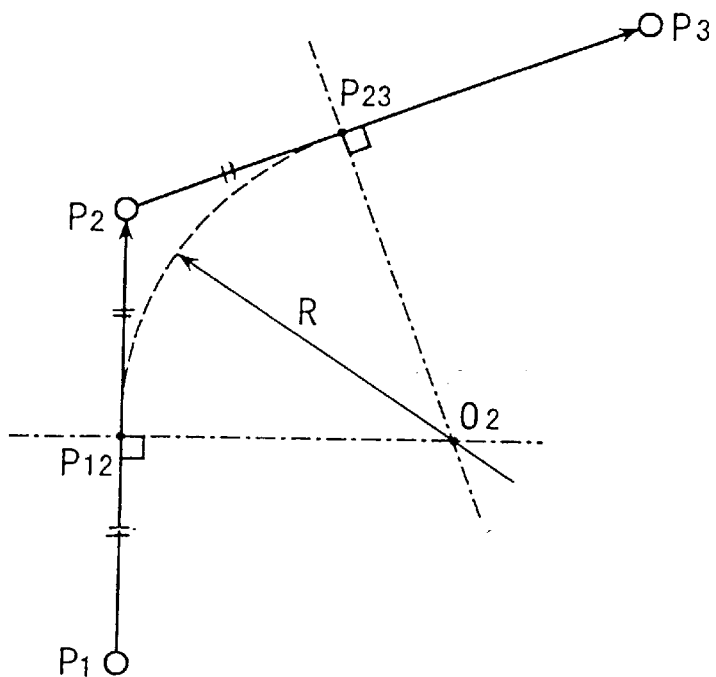
FIG. 2 is an explanatory diagram showing a way of calculating a radius of curvature of a curve.

Further, in the radius of curvature calculating section 17, based on the positional data relating to the mid-point $P_{12}$ and the equivalent mid-point $P_{23}$, as shown in FIG. 2, a point of intersection O2 of respective perpendicular lines from the mid-point $P_{12}$ and the equivalent mid-point $P_{23}$ is determined as a center of a curve of a vehicle pass connecting the mid-point $P_{12}$ and the equivalent mid-point $P_{23}$. Therefore, the distance between O2 and $P_{12}$ or between O2 and $P_{23}$ is a radius of curvature R of the curve. The result of the calculation in the radius of curvature calculating section 17 is sent to the radius of curvature correcting section 18.

The calculation in the radius of curvature calculating section 17 will be described as follows:

$$O_2 = P_{12} + \overline{P_{12}O_2} = (X_{12}, Y_{12}) + M \cdot (Y_2-Y_1, X_1-X_2) \quad (1)$$

$$O_2 = P_{23} + \overline{P_{23}O_2} = (X_{23}, Y_{23}) + N \cdot (Y_3-Y_2, X_2-X_3) \quad (2)$$

Accordingly, $$X_{12} + M \cdot (Y_2-Y_1) = X_{23} + N \cdot (Y_3-Y_2) \quad (3)$$

$$Y_{12} + M \cdot (X_1-X_2) = Y_{23} + N \cdot (X_2-X_3) \quad (4)$$

Eliminating M from equations (3) and (4) to obtain N, $$N = ((X_1-X_2)\cdot(X_{12}-X_{23}) + (Y_1-Y_2)\cdot(Y_{12}-Y_{23}))/(X_1\cdot Y_3 - X_3\cdot Y_1 - X_1\cdot Y_2 + X_2\cdot Y_1 - X_2\cdot Y_3 + X_3\cdot Y_2) \quad (5)$$

The position $O_2$ of the center of the curve is, $$O_2 = (X_{o2}, Y_{o2}) = (X_{23} + N \cdot Y_3 - N \cdot Y_2, Y_{23} + N \cdot X_2 - N \cdot X_3) \quad (6)$$

Accordingly, the radius of curvature R is obtained according to the following equation, $$R = ((X_{o2}-X_{12})^2 + (Y_{o2}-Y_{12})^2)^{1/2} \quad (7)$$

Further, a distance $L_2$ from the center of the curve $O_2$ to the second point $P_2$ is obtained according to the following equation (8):

$$L_2 = ((X_{o2}-X_2)^2 + (Y_{o2}-Y_2)^2)^{1/2} \quad (8)$$

The radius of curvature correcting section 18 acts as a means for correcting a radius of curvature, in which a difference Del between the radius of curvature R and the distance $L_2$ obtained from the radius of curvature calculating section 17 is calculated. If the difference Del exceeds an allowable error value which will be described hereinafter, the radius of curvature R is corrected in such a way that the Del agrees with the allowable error value. The corrected radius of curvature R is outputted to the displaying apparatus 4. If the difference Del is smaller than the allowable error value, the radius of curvature R is needless to be corrected and the exact value R is outputted to the displaying apparatus 4.

The allowable error value, variable according to the road width and the length of the shorter straight line, is established to be $\alpha \cdot D$, where D is a road width and $\alpha$ is a coefficient, which is variable according to the length of the shorter straight line, hereinafter referred to as a point-to-point interval correction coefficient.

The road width D is normally obtained from the road width detecting apparatus 3. In case where it can not be obtained from the road width detecting apparatus 3, the road width D is established based on the road category information such as highways, state roads, provincial roads and the like, obtained from the navigation system 2. As understood from the above description, as the road width D becomes large, the need for correcting the radius of curvature R becomes small. This means that in case of roads of the real world, the difference between an inner R and an outer R of the corner becomes large, as the road width becomes large.

Further, as shown in FIG. 4, the point-to-point interval correction coefficient $\alpha$ is established to become large as the length of the shorter straight line becomes short. As a result the allowable error value becomes large. This means that, as the length of the shorter straight line becomes short, many point data are arranged on the vehicle pass so as to express the road configuration more in detail. That is, as the length of the shorter straight line is short, it becomes more needless to correct the radius of curvature R.

Figure 3:
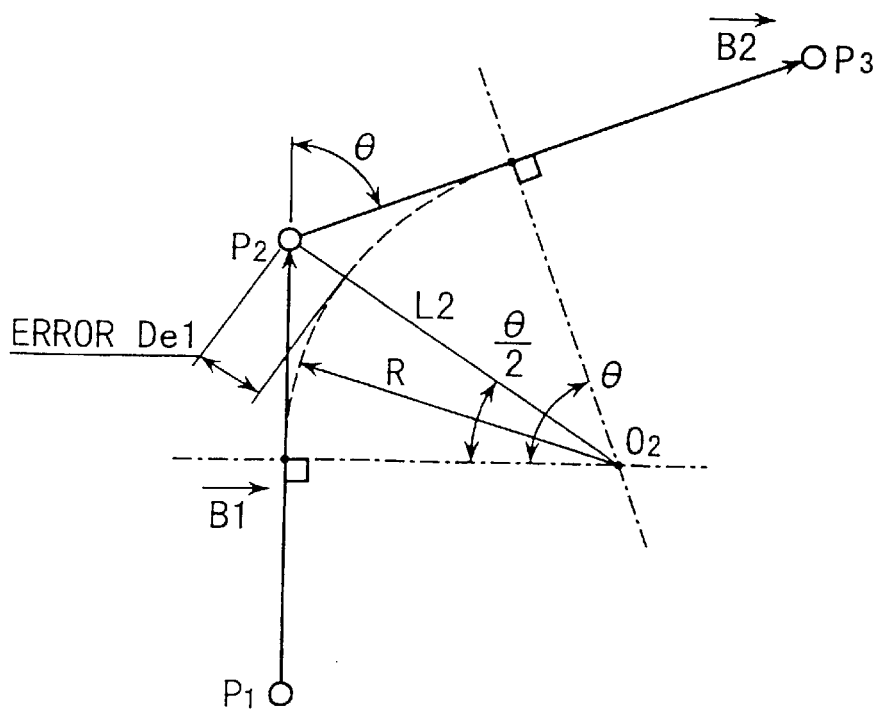
FIG. 3 is an explanatory diagram showing a way of correcting the calculated radius of curvature.

FIG. 3 shows a detailed description of the correction in the correcting section 18. A vector $B_1$ from $P_1$ to $P_2$ and a vector $B_2$ from $P_2$ to $P_3$ are defined to be $B_1 = (X_2-X_1, Y_2-Y_1) = (X_{b1}, Y_{b1})$, $B_2 = (X_3-X_2, Y_3-Y_2) = (X_{b2}, Y_{b2})$, respectively.

Where $\theta$ is an angle contained by $B_1$ and $B_2$, the following equation is obtained:

$$\cos\theta = (X_{b1} \cdot X_{b2} + Y_{b1} \cdot Y_{b2})/(|B_1| \cdot |B_2|),$$

A ratio of error $R/L_2$ (Pdel) is:

$$\text{Pdel} = R/L_2 = \cos(\theta/2) = ((\cos\theta+1)/2)^{1/2} \quad (9)$$

The difference Del between $L_2$ and R is expressed as follows:

$$\text{Del} = L_2 - R = L_2 \cdot (1 - \text{Pdel}) = L_2 \cdot (1 - ((\cos\theta+1)/2)^{1/2}) \quad (10)$$

In case where the difference Del exceeds an allowable error value ($\alpha \cdot D$), the radius of curvature R is corrected so as to be Del = $\alpha \cdot D$. That is to say:

$$L_2 = \text{Del}/(1-((\cos\theta+1)/2)^{1/2})$$

$$= \alpha \cdot D/(1-((\cos\theta+1)/2)^{1/2})$$

$$= \alpha \cdot D/(1-((X_{b1} \cdot X_{b2} + Yb1 \cdot Yb2)+(|B_1| \cdot |B_2|)/(2 \cdot |B_1| \cdot |B_2|))^{1/2}$$

Therefore, $$R = L_2 \cdot \text{Pdel} = \alpha \cdot D/(1-((\cos\theta+1)/2)^{1/2}) \cdot ((\cos\theta+1)/2)^{1/2}$$

$$= \alpha \cdot D/((2/(\cos\theta+1))^{1/2}-1)$$

$$= \alpha \cdot D/((2 \cdot |B_1| \cdot |B_2|/(X_{b1} \cdot X_{b2} + Y_{b1} \cdot Y_{b2} + (|B_1| \cdot |B_2|)))^{1/2}-1) \quad (11)$$

Next, an operation of thus constituted radius of curvature detecting apparatus will be described.

First, the radius of curvature detecting apparatus 1 receives point data presenting roads on the maps, road category information such as highways, state roads, provincial roads and the like from the navigation system 2 and information related to the road width from the road width detecting apparatus 3, respectively.

Further, based on the point data received from the navigation system 2, the three-points detecting section 11 of the radius of curvature detecting apparatus 1 detects three points a first point $P_1$, a second point $P_2$ and a third point $P_3$, on a road on which the vehicle travels or a road selected by a driver in order of traveling direction.

The P1P2 distance calculating section 12, based on the positional information of the first and second points $P_1$, $P_2$ inputted from the three-points detecting section 11, calculates a straight line distance between the first point $P_1$ and the second point $P_2$ and outputs the result of calculation to the distance comparing section 14 and the correcting section 18, respectively.

Further, the $P_2P_3$ distance calculating section 13, based on the positional information of the second and third points $P_2$, $P_3$ inputted from the three-points detecting section 11, calculates a straight line distance between the second point $P_2$ and the third point $P_3$ and outputs the result of calculation to the distance comparing section 14 and the correcting section 18, respectively.

Then, the distance comparing section 14 compares the straight line distance between the first and second points $P_1$ which is inputted from the $P_1P_2$ distance calculating section 12, $P_2$ with the one between the second and third points $P_2$, $P_3$ which is inputted from the $P_2P_3$ distance calculating section 13 and the data (position and distance) relating to the shorter one are outputted to the mid-point calculating section 15 and the radius of curvature correcting section 18, respectively. On the other hand, the data (position and distance) relating to the longer one are outputted to the equivalent mid-point calculating section 16 and the radius of curvature correcting section 18.

The mid-point calculating section 15 calculates a half distance of the shorter one of straight lines based on the data (position and distance) relating to the shorter one which is inputted from the distance comparing section 14 and determines the position of a mid-point $P_{12}$ of the shorter one. The result of this calculation is outputted to the equivalent mid-point calculating section 16 and the radius of curvature calculating section 17.

Further, the equivalent mid-point calculating section 16 determines the position of an equivalent mid-point $P_{23}$ located at a half distance of the shorter straight line on the longer straight line, based on the data (position and distance) relating to the longer straight line which is inputted from the distance comparing section 14 and the data of the half distance of the shorter straight line and outputs the positional data relating to the equivalent mid-point $P_{23}$ to the radius of curvature calculating section 17.

In case where the straight line between $P_3$ and $P_3$ is shorter than the one between $P_1$ and $P_2$, a mid-point is established on the point $P_{23}$ and therefore the point $P_{12}$ becomes an equivalent mid-point.

The radius of curvature calculating section 17 determines as a center of the curve a point of intersection $O_2$ of respective perpendicular lines from the mid-point $P_{12}$ and the equivalent mid-point $P_{23}$ according to the equation (6) and calculates a radius of curvature R based on the position of the center of the curve $O_2$ according to the equation (7). The result of the calculation in the radius of curvature calculating section 17 is outputted to the radius of curvature correcting section 18.

The radius of curvature correcting section 18 calculates a difference Del between the radius of curvature R and the distance $L_2$ from the center of the curve $O_2$ to the point $P_2$. If the difference Del exceeds the allowable error value $\alpha \cdot D$ which is established according to the road width D and the length of the shorter straight line, the radius of curvature R is corrected such that the difference Del becomes equal to the allowable error value $\alpha \cdot D$ according to the equation (11). On the other hand, if the difference Del is below the allowable error $\alpha \cdot D$, the radius of curvature R is not corrected. The corrected or uncorrected radius of curvature R is outputted to the displaying apparatus 4 having a common liquid crystal display with the navigation system 2 and displayed on the liquid crystal display to assist a driver's safe driving.

In summary, according to the present invention, the radius of curvature detecting apparatus can speedily calculate a proper radius of curvature of a curve, with the point data provided by the navigation system, having irregular intervals. Further, the apparatus can obtain a proper value of a radius of curvature without producing any interpolating data or performing complicated calculations.

Further, according to the correcting means provided in the radius of curvature detecting apparatus, since the size of the allowable error can vary in accordance with the road width and the number of point data established on maps, it is possible to obtain proper values of radii of curvature regardless of the number of point data.

In the embodiment of the present invention, the obtained radius of curvature is employed for displaying on a liquid crystal display. However, from the aspect of the object of the present invention, variations as for the use of the radius of curvature may be considered otherwise. For example, sound alarm is more useful than visual alarm especially when the radius of curvature is sharp. Further, information of the radius of curvature may be inputted to vehicle control devices such as throttle control, brake control, automatic transmission control and the like in order to reduce the vehicle speed to a safety level before entering the curve.

Further, in case where such information is applied to a four-wheel steering control apparatus, a control trait having a tendency of adverse phase may be useful in encountering a series of curves or bends and that having a tendency of identical phase may be preferable in going out of curves.

Further, in the embodiment of the present invention, the road width is detected by the road width detecting apparatus but it may be established based on the road information obtained from the navigation system.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A radius of curvature detecting apparatus of a vehicle for detecting a radius of curvature of a curve located ahead of said vehicle based on road information obtained from a vehicle navigation system, comprising:

three-points detecting means for detecting a first point, a second point and a third point in order of traveling direction of said vehicle from point data showing a road configuration and provided by said vehicle navigation system, said first point and said third point being located on said road configuration, and said second point being located away from said curve to define a first tangent to the curve with the first point and to define a second tangent to the curve with the third point;

distance comparing means for comparing a distance of a straight line connecting said first point and said second point with a distance of a straight line connecting said second point and said third point and for determining a short straight line and a long straight line, respectively;

mid-point calculating means for finding a fourth point located at a half distance of said short straight line from said second point;

equivalent mid-point calculating means for finding a fifth point located at said half distance from said second point on said long straight line; and radius of curvature calculating means for determining a point of intersection of perpendicular lines from said fourth point and said fifth point, respectively, as a center of said curve and for calculating a radius of curvature based on said center of said curve.

2. A radius of curvature detecting apparatus of a vehicle for detecting a radius of curvature of a curve located ahead of said vehicle based on road information obtained from a vehicle navigation system, comprising:

three-points detecting means for detecting a first point, a second point and a third point in order of traveling direction of said vehicle from point data showing a road configuration and provided by said vehicle navigation system;

distance comparing means for comparing a distance of a straight line connecting said first point and said second point with a distance of a straight line connecting said second point and said third point and for determining a short straight line and a long straight line, respectively;

mid-point calculating means for finding a fourth point located at a half distance of said short straight line from said second point;

equivalent mid-point calculating means for finding a fifth point located at said half distance from said second point on said long straight line;

radius of curvature calculating means for determining a point of intersection of perpendicular lines from said fourth point and said fifth point, respectively, as a center of said curve and for calculating a radius of curvature based on said center of said curve; and radius of curvature correcting means for correcting said radius of curvature calculated in said radius of curvature calculating means, when a difference between a distance from said center of curvature to said second point and said radius of curvature exceeds a predetermined allowable error value, in such a way that said difference agrees with said predetermined allowable error value.

3. The radius of curvature detecting apparatus according to claim 2, wherein said predetermined allowable error value varies in accordance with a road width.

4. The radius of curvature detecting apparatus according to claim 3, wherein said road width is established based on data obtained from an image information.

5. The radius of curvature detecting apparatus according to claim 3, wherein said road width is established based on data obtained from a road map in said navigation system.

6. The radius of curvature detecting apparatus according to claim 2, wherein said predetermined allowable error value varies in accordance with a distance of said short straight line.

7. A radius of curvature detecting method of detecting a radius of curvature of a curve of a road based on point data showing a configuration of said road, comprising the steps of:

detecting a first point, a second point and a third point from said point data, said first point and said third point being located on said road configuration, and said second point being located away from said curve to define a first tangent to the curve with the first point and to define a second tangent to the curve with the third point;

comparing a distance of a straight line connecting said first point and said second point with a distance of a straight line connecting said second point and said third point and determining a short straight line and a long straight line, respectively;

finding a fourth point located at a half distance of said short straight line from said second point;

finding a fifth point located at said half distance from said second point on said long straight line; and determining a point of intersection of perpendicular lines from said fourth point and said fifth point, respectively, as a center of said curve and calculating a radius of curvature based on said center of said curve.

8. A radius of curvature detecting method of detecting a radius of curvature of a curve of a road based on point data showing a configuration of said road, comprising the steps of:

detecting a first point, a second point and a third point from said point data;

comparing a distance of a straight line connecting said first point and said second point with a distance of a straight line connecting said second point and said third point and determining a short straight line and a long straight line, respectively;

finding a fourth point located at a half distance of said short straight line from said second point;

finding a fifth point located at said half distance from said second point on said long straight line;

determining a point of intersection of perpendicular lines from said fourth point and said fifth point, respectively, as a center of said curve and calculating a radius of curvature based on said center of said curve; and correcting said calculated radius of curvature when a difference between a distance from said center of curvature to said second point and said radius of curvature exceeds a predetermined allowable error value, in such a way that said difference agrees with said predetermined allowable error value.

* * * * *